3,715,361
ACYL DERIVATIVES OF 10-METHOXYIBOGAMINE
Joseph William Epstein, Monroe, and Leon Goldman, Nanuet, N.Y., assignors to American Cyanamid Company, Stamford, Conn.
No Drawing. Filed Oct. 8, 1971, Ser. No. 187,895
Int. Cl. C07d 43/38
U.S. Cl. 260—293.53        4 Claims

ABSTRACT OF THE DISCLOSURE

This disclosure describes compounds of the class of acyl derivatives of 10-methoxyibogamine useful as analgetic and anti-inflammatory agents.

BRIEF SUMMARY OF THE INVENTION

This invention relates to new organic compounds and, more particularly, is concerned with 9-formyl-10-methoxyibogamine (I), 11-formyl - 10 - methoxyibogamine (II), 11-formyl-10-methoxy-1-methylibogamine (III) and 1,11-diacetyl - 10 - methoxyibogamine (IV), and with methods of preparing these compounds. The novel compounds of the present invention may be represented by the following structural formulae:

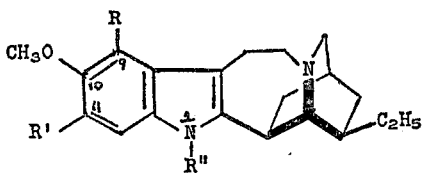

(I)     R=CHO, R′=R″=H
(II)    R′=CHO, R=R″=H
(III)   R′=CHO, R=H, R″=CH₃
(IV)    R′=R″=COCH₃; R=H

DETAILED DESCRIPTION OF THE INVENTION

The novel compounds of the present invention are colorless or yellow, crystalline or amorphous solids with characteristic melting points and spectral properties. The free bases are soluble in such common organic solvents as lower alkanols, chloroform, acetone, benzene, N,N-dimethylformamide, dioxane and dimethyl sulfoxide. They are, however, generally insoluble in water.

The organic free bases of this invention form non-toxic acid-addition salts with a variety of organic and inorganic salt-forming reagents. Thus, acid- addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic and the like. For purposes of this invention, the organic free bases are equivalent to their non-toxic acid-addition salts.

The novel compounds I, II and III of the present invention may be readily prepared by the classical Vilsmeier-Haack reaction by reacting one mole of 10-methoxyibogamine (ibogaine, V), or 10-methoxy-1-methylibogamine (VI) with two moles of phosphorous oxychloride in excess N,N-dimethylformamide under anhydrous conditions for 40 to 55 minutes at temperatures ranging between 0° C. and 100° C., followed by reaction with aqueous ammonium hydroxide.

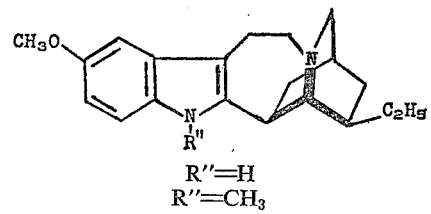

(V)      R″=H
(VI)     R″=CH₃

The 11-formyl derivative (II) may be prepared alternatively by reacting one mole of 10-methoxyibogamine (V) with three moles of chloromethylenedimethylammonium chloride in chloroform for 20 minutes at room temperature, followed by reaction with aqueous ammonium hydroxide. This reaction is an extension of the Vilsmeier-Haack reaction.

Alternatively, compounds I and II may be prepared by the reaction of one mole of 10-methoxyibogamine (V) with two moles of s-triazine in trifluoroacetic acid for 15 minutes at temperatures ranging between 5° C. and room temperature, followed by reaction with aqueous ammonium hydroxide.

1,11-diacetyl-10-methoxyibogamine (IV) may be prepared by the reaction of 10-methoxyibogamine (V) with a mixture of acetic acid, acetic anhydride and boron trifluoride for 2½ hours at —20° C., followed by reaction with aqueous ammonium hydroxide.

In all cases the reaction mixtures may be separated into individual component compounds by liquid-liquid partition chromatography on diatomaceous earth using heptane/2-methoxyethanol or by column chromatography on magnesium silicate using chloroform/acetone.

The novel compounds of the present invention are active analgetics when measured by the "writhing syndrome" test for analgetic activity as described by Siegmund et al., Proc. Soc. Exptl. Biol. Med., vol. 9, p. 729 (1957), with modifications. This method is based upon the reduction of the number of writhes following the intraperitoneal injection of one mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, the novel compounds of the present invention showed analgetic activity when tested by this procedure at the oral doses indicated in the following table:

| Compound | Dose, mg./kg. of body weight | Number of writhes Pair No. 1 | Number of writhes Pair No. 2 |
|---|---|---|---|
| I........ 9-formyl-10-methoxyibogamine....... | 100 | 0 | 0 |
| II....... 11-formyl-10-methoxyibogamine...... | 100 | 6 | 6 |
| III...... 11-formyl-10-methoxy-1-methylibogamine. | 25 | 0 | 0 |
| IV....... 1,11-diacetyl-10-methoxyibogamine.. | 100 | 1 | 1 |

Experiments were conducted to determine analgesia by a modification of the method of Randall and Selitto (Arch. Int. Pharmacodyn., vol. 111: 409–419, 1957). This method was used to measure the pain threshold of rats whose paws were made sensitive to pressure by injection of a 20% aqueous suspension (0.1 ml.) of brewers yeast into the plantar surface of the left hind paw. The pressure in grams which, when applied to the inflamed paw, elicited a sudden struggle or vocalization was recorded. A maximum (cut-off) pressure of 250 grams was employed. Control rats respond at a pressure of about 25 grams. A ratio of post/pretreatment reaction thresholds was calculated. The following table summarizes the results.

| Compound | | Dose, mg./kg. of body weight | Post-treatment/pretreatment reaction threshold | | |
|---|---|---|---|---|---|
| | | | No. of rats | Test 1 | Test 2 |
| II | 11-formyl-10-methoxy-ibogamine. | 1 200 | 5 | 2.28 | 2.37 |
| IV | 1,11-diacetyl-10-methoxyibogamine. | 1 100 | 4 | 1.52 | 1.57 |
| IV | do | 2 50 | 4 | 1.44 | |

1 P.O.  2 I.P.

A useful test for anti-inflammatory activity consists of determining the drug-induced suppression of inflammation in the paws of rats injected with dilute aqueous solutions of carrageenin, according to C. A. Winter, E. A. Risley, and G. W. Nuss, Proceedings of the Society for Experimental Biology and Medicine, vol. 111, pp. 544–547 (1962). By this method, rats are injected in the right hind paw with 0.05 milliliter of 1% carrageenin and the volume of the resulting edema is measured by displacement of mercury after four hours. The volume of the edema in the drug-treated (250 mg./kg. orally) animals is compared with that of the untreated controls in the form of a control to treated ratio, designated the C/T efficacy ratio. The geometric mean of the ratios measured in a two-stage sequential screening procedure is determined. A two-stage means ratio of >1.43 indicates the test compounds of this invention are accepted as active anti-inflammatory agents when compared to parallel controls. The following table summarizes the results.

| Compound | | Dose, mg./kg. of body weight | C/T efficacy ratio | |
|---|---|---|---|---|
| | | | Pair No. 1 | Pair No. 2 |
| III | 11-formyl-10-methoxy-1-methylibogamine. | 125 | 1.73, 1.55 | 1.82, 1.75 |
| IV | 1,11-diacetyl-10-methoxyibogamine. | 250 | 2.85, 1.93 | 2.06, 2.25 |

When mixed with suitable excipients or diluents, the compounds of this invention can be prepared as pills, capsules, tablets, powders, solutions, suspensions, and the like for unit dosages and to simplify administration.

The invention will be described in greater detail in conjunction with the following specific examples.

EXAMPLE 1

Preparation of 9-formyl-10-methoxyibogamine and 11-formyl-10-methoxyibogamine

To 90 ml. of N,N-dimethylformamide cooled to 0° C. under nitrogen, was added 5.4 ml. of phosphorous oxychloride. After stirring the solution for 10 minutes in an ice bath, 9.00 g. of 10-methoxyibogamine (ibogaine) in 50 ml. of N,N-dimethylformamide was added in one portion. The red solution was stirred in an ice bath for 10 minutes and then was heated on a steam bath for 30 minutes. The cooled solution was poured into 1 l. of water, the solution was made basic with concentrated ammonium hydroxide, the yellow precipitate was removed by filtration, air-dried, and then dissolved in dichloromethane. Evaporation of the solution under reduced pressure yielded 12.80 g. of a dark brown oil. The total crude product was subjected to partition chromatography on 880 g. of diatomaceous earth using a heptane/2-methoxyethanol solvent system. From the seventh and eighth HBV there was obtained, by concentration and filtration, 2.30 g. of yellow crystals. Recrystallization from ethanol yielded 1.36 g. of 11-formyl-10-methoxyibogamine as yellow plates, M.P. 243–245° C., I.R. (KBr) 2.90, 6.02 and 6.17μ. The packing was extruded from the column and a yellow region was excised and eluted with methanol. The solution was evaporated under reduced pressure to yield 0.926 g. of 9-formyl-10-methoxyibogamine as a yellow glass, I.R. (KBr) 3.03 and 6.02μ.

EXAMPLE 2

Preparation of 11-formyl-10-methoxyibogamine

A solution of 0.500 g. of 10-methoxyibogamine (ibogaine) and 0.580 g. of chloromethylenedimethylammonium chloride in 15 ml. of chloroform was allowed to stand at room temperature for 20 minutes. The dark yellow solution was combined with water and the chloroform was removed under reduced pressure. The aqueous solution was made basic with ammonium hydroxide, and the resulting emulsion was extracted with dichloromethane and the extract was dried over sodium sulfate. Evaporation of the solution under reduced pressure yielded 0.359 g. of yellow gum which was subjected to partition chromatography on 350 g. of diatomaceous earth using a heptane/2-methoxyethanol solvent system. From the fifth and sixth HBV there was obtained, by concentration and filtration, 0.101 g. of yellow crystals, M.P. 238–243° C. Recrystallization from ethanol yielded 1-formyl-10-methoxyibogamine as yellow plates, M.P. 241–245° C., I.R. (KBr) 2.90, 6.02 and 6.17μ.

EXAMPLE 3

Preparation of 9-formyl-10-methoxyibogamine and 11-formyl-10-methoxyibogamine

To a stirred solution of 3.10 g. of 10-methoxyibogamine (ibogaine) in 25 ml. of trifluoroacetic acid at 5° C. was added 1.62 g. of solid s-triazine over a 5 minute period. The deep amber solution was stirred for 10 minutes at room temperature and was then poured into 200 ml. of water and the solution was then made basic with concentrated ammonium hydroxide. The gummy precipitate was extracted into chloroform and the extract was dried over sodium sulfate. Chromatography on a 6" x 2" magnesium silicate column and eluting with chloroform and chloroform/acetone (1:1) yielded 11-formyl-10-methoxyibogamine as the first fraction [T.L.C. on silica gel G in heptane/chloroform/diethylamine (5:4:1) gave $R_f$=0.48]. Further elution with chloroform/acetone (1:1) yielded 2.40 g. of 9-formyl-10-methoxyibogamine as an amber glass. This material was subjected to partition chromatography on 660 g. of diatomaceous earth using a heptane/2-methoxyethanol solvent system, and evaporation under reduced pressure of the eluate from the fifth to the eighth HBV yielded 1.51 g. of a yellow glass. A solution of this material in dichloromethane was filtered through magnesium silicate and the filtrate was evaporated under reduced pressure to yield 0.700 g. of yellow glass. Chromatography of this material on neutral alumina, eluting with chloroform, yielded 0.270 g. of 9-formyl-10-methoxyibogamine as a yellow glass which, on being dried at 50° C. (0.003 mm.), had M.P. 93–96° C. (softens at 89° C.), I.R. (KBr) 3.03 and 6.02μ.

EXAMPLE 4

Preparation of 11-formyl-10-methoxy-1-methylibogamine

To 15 ml. of N,N-dimethylformamide, cooled to 0° C. under nitrogen, was added 0.9 ml. of phosphorous oxychloride. After stirring the solution for 10 minutes in an ice bath, 1.50 g. of 10-methoxy-1-methylibogamine in 25 ml. of N,N-dimethylformamide was added in one portion. The red solution was stirred in an ice bath for 15 minutes and then was heated on a steam bath for 40 minutes. The resulting deep yellow solution was cooled to room temperature and was poured into 500 ml. of water containing 10 g. of sodium acetate. The solution was made basic with 5 ml. of concentrated ammonium hydroxide and the yellow precipitate which formed was removed by filtration, dissolved in dichloromethane and this solution was dried over magnesium sulfate. Evaporation of the solution under reduced pressure yielded 1.62 g. of yellow gum. Chromatography of the gum on neutral alumina and eluting with hexane/chloroform mixtures yielded, after evaporation of the eluates, 1.46 g. of yellow gum. This gum was subjected to partition chromatography on 880 g. of diatomaceous earth using a heptane/2-methoxyethanol solvent system to yield 0.583 g. of yellow crystals, M.P. 144–149° C., from the second HBV by concentration and filtration. Recrystallization from methanol and then from ethyl acetate/hexane yielded 0.272 g. of 11-formyl-10-methoxy-1-methylibogamine as yellow plates, M.P. 147–149° C., I.R. (KBr) 5.99 and 617µ.

EXAMPLE 5

Preparation of 1,11-diacetyl-10-methoxyibogamine

A mixture of 50 ml. of acetic acid and 100 ml. of acetic anhydride was cooled to −10° C. and was saturated with boron trifluoride by passing the gas through the stirred mixture for 15 minutes. A solution of 10.00 g. of 10-methoxyibogamine (ibogaine) in 30 ml. of dichloromethane and 50 ml. of acetic anhydride was added to the stirred mixture over a 3 minute period. The orange solution was stirred for 2½ hours at −20° C. and was then poured onto ice. The mixture was made basic with concentrated ammonium hydroxide, extracted with dichloromethane and the extract was dried over sodium sulfate. Evaporation of the solution under reduced pressure yielded 17.5 g. of an oil which was subjected to partition chromatography on 660 g. of diatomaceous earth using a heptane/2-methoxyethanol solvent system. From the second HBV there was obtained 1.00 g. of colorless crystals which, on recrystallization from hexane/ethyl acetate, yielded 0.310 g. of 1,11-diacetyl-10-methoxyibogamine as colorless needles, M.P. 94.0–95.5° C., I.R. (KBr) 5.88 and 599µ

We claim:

1. A compound selected from the group consisting of 9-formyl-10-methoxyibogamine and the non-toxic acid-addition salts thereof.

2. A compound selected from the group consisting of 11-formyl-10-methoxyibogamine and the non-toxic acid-addition salts thereof.

3. A compound selected from the group consisting of 11-formyl-10-methoxy-1-methylibogamine and the non-toxic acid-addition salts thereof.

4. A compound selected from the group consisting of 1,11-diacetyl-10-methoxyibogamine and the non-toxic acid-addition salts thereof.

References Cited

UNITED STATES PATENTS 3,557,126  1/1971  Sallay _____ 260—293

HENRY R. JILES, Primary Examiner

G. T. TODD, Assistant Examiner

U.S. Cl. X.R.

424—267